March 28, 1961 S. E. TOWNSEND 2,977,539
REVERSIBLE BINARY COUNTER
Filed Dec. 24, 1958
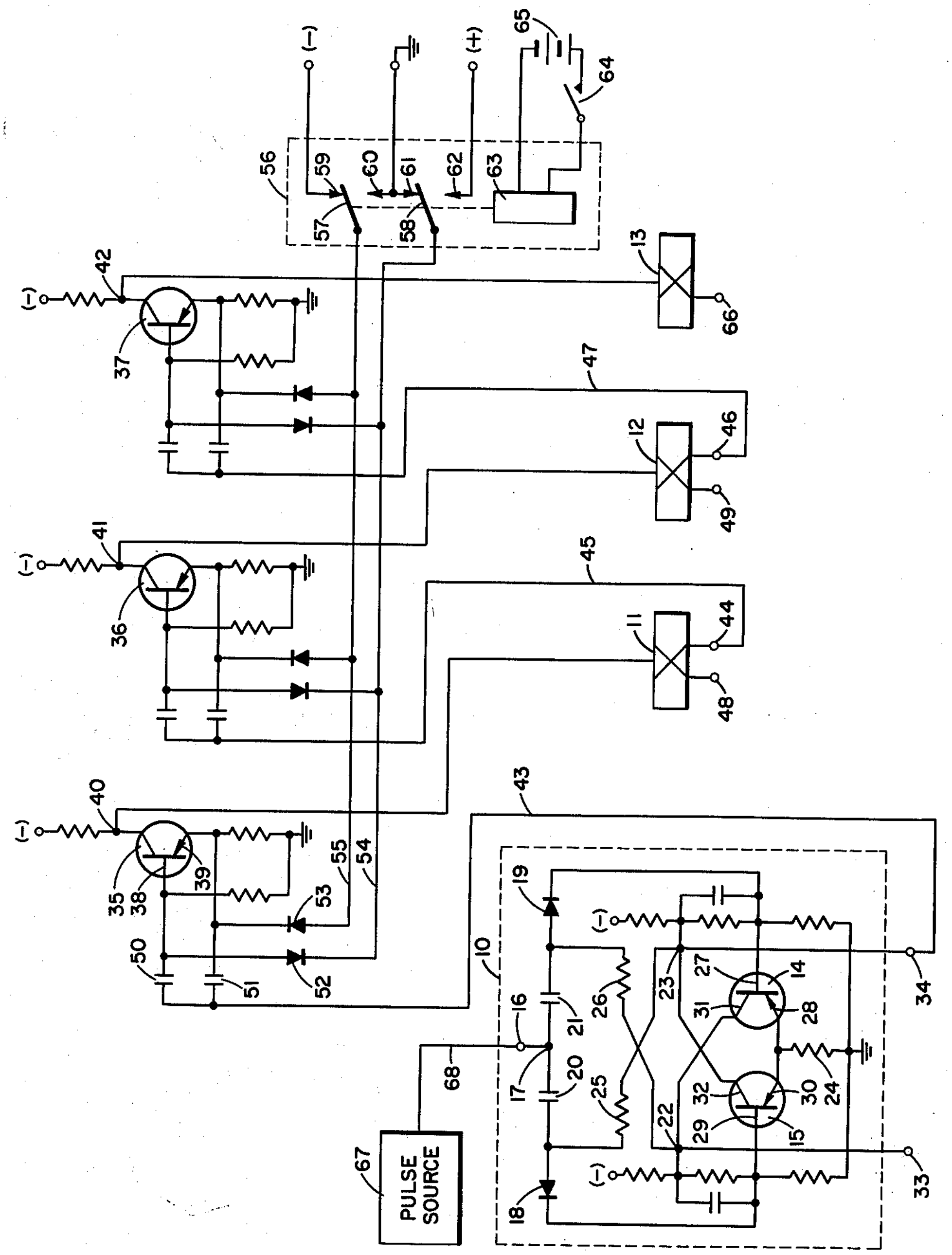
INVENTOR.
STEPHEN E. TOWNSEND
BY Richard G. Stahr
ATTORNEY 2,977,539

REVERSIBLE BINARY COUNTER

Stephen E. Townsend, Rochester, N.Y., assignor to General Dynamics Corporation, Rochester, N.Y., a corporation of Delaware Filed Dec. 24, 1958, Ser. No. 782,922

3 Claims. (Cl. 328—42)

The present invention relates to binary counter circuits and, more specifically, to a reversible binary counter circuit.

In the use of digital data processing equipment, it is desirable to provide a binary counting circuit which may be adapted to count in the forward and also in the reverse direction through the application thereto of pulses of the same one polarity. In view of the recent widespread use of processing equipment of this type, the requirement of a reversible binary counter which is simple in construction and reliable in operation is apparent.

It is, therefore, an object of this invention to provide an improved reversible binary counter.

Another object of this invention is to provide an improved reversible binary counter which may be rendered operative in either direction through the application thereto the same polarity signals.

In accordance with this invention, a source of trigger signals for each binary element stage of a binary counter circuit may be selectively rendered responsive to either one of two signals of opposite polarity which are alternately produced by the preceding binary element stage upon each reversal of the condition of operation thereof for forward counting and to the other of said first or second polarity signals for reverse counting.

For a better understanding of the present invention, together with further objects, advantages and features thereof, reference is made to the following description and accompanying single figure drawing which illustrates a preferred embodiment of this invention.

The basis of the reversible binary counter of this invention is a plurality of binary elements each having at least one input circuit and each capable of a first and a secod stable condition of operation which may be produced alternately in response to the application thereto of a selected polarity trigger signal. While any binary element device may be employed for this purpose, for illustration only and with no intention or inference that this invention be limited hereto, these binary elements may be single input bistable multivibrator circuits which have two stable conditions of operation which may be alternately produced through the application of successive signals to the single input circuit thereof and of the proper polarity to which the circuit is designed to be responsive. These circuits are indicated by reference numerals 10, 11, 12 and 13. The detailed circuitry of multivibrator 10 has herein been shown; however, since the details of the remainder are identical, in the interest of drawing simplicity, they have herein been indicated in block form. Multivibrator circuits of this type are known as "flip-flops," and as such will hereinafter be referred.

The first and second stable condition of operation of flip-flop circuits of this type may be produced alternately in response to the application thereto of a selected polarity trigger signal in a manner now to be explained. For purposes of illustration only, it will be assumed that the first condition of operation of flip-flop 10 is arbitrarily chosen to be during that period while transistor 14 is conducting and transistor 15 is not conducting. In the detailed circuitry as herein illustrated, the application of a positive-going trigger signal to the input circuit terminal 16 thereof is required to reverse the condition of operation of flip-flop 10. The positive trigger signal presented to input terminal 16 divides at point 17 and is applied simultaneously to diodes 18 and 19 through respective capacitors 20 and 21. In the first condition of operation, with transistor 14 conducting and transistor 15 not conducting, point 22 is at substantially ground potential because of the low impedance path through current saturated transistor 14 and the relatively low value of emitter resistor 24 and point 23 is at a negative potential substantially equal to the supply potential. The negative potential present at point 23 is applied through resistor 25 to diode 18, thereby back-biasing diode 18 which prevents the conduction of the positive trigger signal therethrough. The substantially ground potential present at point 22, however, is applied to diode 19 through resistor 26 thereby forward-biasing diode 19 which permits the conduction of the positive trigger signal therethrough. As diode 19 passes the positive trigger signal, it is applied to the base 27 of transistor 14, thereby turning transistor 14 "off" as the base 27 is rendered more positive than the emitter 28, a condition which does not satisfy the base-emitter bias requirements for conduction through a type P-N-P transistor. As transistor 14 is rendered nonconductive, the potential of point 22 goes negative to a value substantially equal to the supply potential thereby rendering the base 29 of transistor 15 negative in respect to the emitter 30. As this condition satisfies the base-emitter bias requirements for conduction through a type P-N-P transistor, transistor 15 is turned "on" with the attendant conduction of curent therethrough. The application of the next positive-going trigger signal to input terminal 16 would be applied through diode 18 to the base 29 of transistor 30 in that the potential at point 23 is at substantially ground potential, thereby forward-biasing diode 18 through resistor 25. However, as the potential of point 2 is of a negative magnitude substantially equal to the supply potential at this time and is applied to diode 19 through resistor 26, diode 19 is back-biased which prevents the conduction therethrough of the positive trigger signal. At this time, transistor 15 is rendered nonconductive and transistor 14 rendered conductive in a manner similar to that previously described. From this description, it is readily apparent that the first and second conditions of operation of flip-flop circuits of this kind may be alternately produced in response to the application thereto of the proper polarity trigger signals, in this instance positive.

From the description just given, it is apparent that opposite polarity signals are alternately produced at the respective collectors of transistors 14 and 15 with each reversal of condition of operation and appear at points 22 and 23, respectively. Considering each collector separately, a characteristic of flip-flop circuits of this type is the production of a first polarity signal with each reversal from the first to the second condition of operation and a second polarity signal with each reversal from the second to the first condition of operation.

In respect to collector 31 of transistor 14, while flip-flop 10 is in the first condition of operation with transistor 14 conducting, the potential of collector 31, which may be taken off point 22, is substantially ground. As the condition of operation of flip-flop 10 is reversed to the second condition, transistor 14 is rendered nonconductive and the potential of collector 31, which may be taken off point 22, goes negative, thereby producing a negative-going signal upon output circuit terminal 33. As the condition of operation of flip-flop 10 is reversed from the second to the first condition, transistor 14 is rendered conductive and the potential of collector 31, which may be taken off point 22, is positive-going toward ground, thereby producing a positive-going signal upon output circuit terminal 33.

Similarly in respect to collector 32 of transistor 15, while flip-flop 10 is in the first condition of operation with transistor 15 not conducting, the potential of collector 32, which may be taken off point 23, is of a negative magnitude substantially equal to the supply potential. As the condition of operation of flip-flop 10 is reversed to the second condition, transistor 15 is rendered conductive and the potential of collector 32, which may be taken off point 23, is positive-going from a negative value toward ground, thereby producing a positive-going signal upon output circuit terminal 34. As the condition of operation of flip-flop 10 is reversed from the second to the first condition, transistor 15 is rendered nonconductive and the potential of collector 32, which may be taken off point 23, is negative-going from ground, thereby producing a negative-going signal upon output circuit terminal 34.

To provide the counting feature in any counting circuit comprising a chain of flip-flops, it is necessary that the proper polarity trigger signals produced by either collector in each flip-flop of the chain with every other reversal of condition of operation of any of the flip-flops in the chain be applied to the next succeeding flip-flop to reverse its condition of operation, thereby indicating the count of two. To provide a reversible feature in a binary counting chain, it is necessary that the alternate signals, produced by the same collector in each flip-flop of the chain with every other reversal of condition of operation of any of the flip-flops in the chain, which are normally not of the proper polarity to trigger the next following flip-flop of the chain may be selectively rendered operative to trigger the next flip-flop of the chain.

In accordance with this invention, a trigger signal source, which may be selectively rendered responsive to either the first or second polarity signals and which, when triggered, always produces the same polarity trigger signal, corresponding to each of the binary elements of the counting chain except that one selected to be the first, is provided. These signal sources may be transistor devices each of which is connected in the form of a switch and herein indicated by reference numerals 35, 36 and 37, each corresponding to flip-flops 11, 12 and 13, respectively. In that the circuitry and operation of each of these signal sources is identical in every respect with every other, the operation of only transistor 35 will be described. In the normal condition of operation, transistor 35 is in a state of nonconduction in that the base 38 and the emitter 39 are at substantially ground potential, a condition which does not satisfy the base-emitter bias requirements for conduction through a type P-N-P transistor. In this condition, therefore, point 40 is at a negative potential of a magnitude substantially equal to that of the supply potential. However, as transistor 35 is triggered and rendered conductive, in a manner to be hereinafter described, the potential of point 40 is positive-going toward ground potential, thereby producing the proper polarity positive-going trigger signal which is applied to the input terminal of flip-flop 11, as indicated. The respective points 41 and 42 of transistors 36 and 37 may be caused to produce this same proper polarity positive trigger signal in the same manner as has been described for transistor 35, the trigger signals thereat produced being applied to the input circuits of flip-flops 12 and 13, respectively, as indicated. The first and second polarity signals produced by either collector in any one of the flip-flops are applied to the signal source which corresponds to the next succeeding flip-flop of the chain. That is, the first and second polarity signals which appear at output circuit terminal 34 of flip-flop 10 are applied through lead 43 to transistor 35 which corresponds to flip-flop 11; the first and second polarity signals which appear at output circuit terminal 44 of flip-flop 11 are applied through lead 45 to transistor 36 which corresponds to flip-flop 12; the first and second polarity signals which appear at output circuit terminal 46 of flip-flop 12 are applied through lead 47 to transistor 37 which corresponds to flip-flop 13.

While only four flip-flops have herein been indicated, it is specifically understood that more may be added through the medium of cascading similar circuits as have herein been described. It should also be noted at this point that first and second polarity signals are also produced at respective output circuit terminals 33, 48 and 49 of flip-flops 10, 11 and 12 in a manner as has previously been described. It is to be specifically understood that respective output circuit terminals 34, 44 and 46 have arbitrarily been selected to be the terminals from which the first and second polarity signals have been taken to be applied to the trigger signal source corresponding to the next succeeding flip-flop of the chain. The first and second polarity signals which appear at respective output circuit terminals 33, 48 and 49 may also be applied to the signal source corresponding to the next succeeding flip-flop circuit with the proper provision for the several polarities to be compatible therewith.

As each of the signal sources 35, 36 and 37 produce the same polarity signal, in this instance positive, each time they are triggered, to provide the reversible counting feature, it is necessary that they may be selectively rendered responsive to either the first or second polarity signals for forward counting and to the other of the first or second polarity signals for reverse counting. As the circuitry and operation of each of the signal sources 35, 36 and 37 are identical in every respect, the method of rendering these signal sources selectively responsive to either the first or second polarity signals will be described in regard to transistor 35 only. Output circuit terminal 34 of flip-flop 10 is connected to transistor 35 through lead 43 which provides for the simultaneous application of either signal appearing at output circuit terminal 34 to the base 38 and the emitter 39 of transistor 35 through respective coupling capacitors 50 and 51. Similarly, output circuit terminal 44 of flip-flip 11 and output circuit terminal 46 of flip-flop 12 are interconnected with the bases and emitters of respective transistors 36 and 37. By properly biasing base diode 52 and emitter diode 53, transistor 35 may be selectively rendered responsive to positive polarity signals or to negative polarity signals.

Placing a zero or ground bias upon base diode 52 and a negative bias upon emitter diode 53 through leads 54 and 55, respectively, base diode 52 is thereby forward biased and emitter diode 53 is back biased. The appearance of a positive input signal at this time will be applied to the emitter 39 of transistor 35, thereby biasing the emitter 39 more positive than the base 38. As this condition satisfies the base-emitter bias requirements for conduction through a type P-N-P transistor, transistor 35 is rendered conductive and a positive signal appears at point 40 in a manner as has previously been described. This positive input signal will not appear at base 38 in that it is shunted to ground through forward biased diode 52. A negative signal appearing at this time will be applied equally to the base 38 and the emitter 39 in that diode 53, being back biased, will not conduct negative signals while diode 52 is incorrectly poled to conduct negative signals. As this condition does not satisfy the base-emitter bias requirements for conduction through a type P-N-P transistor, transistor 35 will be unaffected and a positive-going signal will not appear at point 40.

Placing a positive bias upon diode 52 and zero or ground bias upon diode 53 through respective leads 54 and 55, diode 52 is back biased and diode 53 is forward biased. The appearance of a negative input signal at this time will be applied to the base 38 of transistor 35, thereby biasing the base 38 more negative than the emitter 39. As this condition satisfies the base-emitter bias requirements for conduction through a type P-N-P transistor, transistor 35 is rendered conductive and a positive signal appears at point 40 in a manner as has previously been described. This negative input signal will not appear at emitter 39 in that it is shunted to ground through forward biased diode 53. A positive signal appearing at this time will be applied equally to the base 38 and the emitter 39 in that diode 52, being back biased, will not conduct positive signals while diode 53 is incorrectly poled to conduct positive signals. As this condition does not satisfy the base-emitter bias requirements for conduction through a type P-N-P transistor, transistor 35 will be unaffected and a positive signal will not appear at point 40.

One method of providing the required switching for producing the desired bias potentials upon leads 54 and 55 is through the use of a relay 56 having two movable contacts 57 and 58 and four stationary contacts 59, 60, 61 and 62. Stationary contact 59 may be returned to a negative potential source; stationary contact 62 may be returned to a positive potential source, while stationary contacts 60 and 61 may be returned to ground or zero potential, as indicated. Relay 56 may be of the type in which contacts 57 and 59 and 58 and 61 are normally closed and when the operating coil 63 is energized, through the closure of switch 64, by potential source 65, contacts 57 and 60 and 58 and 62 are closed. Therefore, in the unoperated condition of relay 56, a negative bias potential is placed upon lead 55 and diode 53 and a zero or ground bias potential is placed upon lead 54 and diode 52, while in the operated condition of relay 56, a zero or ground bias potential is placed upon lead 55 and diode 53 and a positive bias potential is placed upon lead 54 and diode 52. It is to be specifically understood that relay 56 is illustrative only of a single method of providing the desired bias switching circuitry and that any other satisfactory switching scheme may be employed which produces the same end results.

For purposes of illustration, it will be assumed that the signal present upon the respective left output circuit terminals 33, 48, 49 and 66 of flip-flops 10, 11, 12 and 13 is determinative of whether the flip-flop is thought to be in its "1" or "0" condition of operation and that the presence of a zero or substantially ground signal at any of these output circuit terminals denotes a "1" condition of operation, while the presence of a negative potential signal at any one of these output circuit terminals denotes the "0" condition of operation of the associated flip-flop. As the right output circuit terminal of each of these flip-flops is connected to the collector which is at a negative potential for the "1" state of that flip-flop, a reversal of the condition of operation of that flip-flop from the "1" to the "0" condition will produce a positive-going signal at the right output circuit terminal while a reversal of condition of operation from the "0" to the "1" condition of operation will produce a negative-going signal at the right output circuit terminal.

For forward counting, the reversal of the condition of operation of any of the flip-flops from the "1" condition to the "0" condition of operation should produce a signal of the proper polarity to trigger the next succeeding flip-flop of the chain. Therefore, in the circuit of this invention, the respective signal sources 35, 36 and 37 should be rendered responsive to positive polarity signals by placing a ground or zero bias upon the respective base diodes and a negative bias upon the respective emitter diodes. In the circuit of Figure 1, this may be accomplished by maintaining relay 56 unenergized, in which condition relay contacts 57 and 59 are closed, thereby placing a negative bias potential upon lead 55 and the respective emitter diodes, and relay contacts 58 and 61 are closed, thereby placing a ground or zero bias potential upon lead 54 and the respective base diodes. Under these conditions, the respective signal sources 35, 36 and 37 are rendered responsive to the positive polarity signals produced by each of the flip-flops 10, 11 or 12 upon each reversal from the "1" to the "0" condition of operation and which appear at the respective right output circuit terminals 34, 44 or 46 thereof but are not responsive to the negative polarity signals produced by each of the flip-flops 10, 11 or 12 with each reversal from the "0" to the "1" condition of operation and which also appear at the respective right output circuit terminals 34, 44 or 46 thereof.

For reverse counting, the reversal of condition of operation of any of the flip-flops from the "0" condition to the "1" condition of operation should produce a signal of the proper polarity to trigger the next succeeding flip-flop of the counting chain. Therefore, in the circuit of this invention, the respective signal sources 35, 36 and 37 should be rendered responsive to negative polarity signals, with the resulting production of a positive polarity output signal, by placing a positive bias upon the respective base diodes and a ground or zero bias upon the respective emitter diodes. In the circuit of Figure 1, this biasing arrangement may be effected through the closure of switch 64 which provides for the energization of operating coil 63 of relay 56, in which condition relay contacts 58 and 62 are closed, thereby placing a positive bias potential upon lead 54 and the respective base diodes, and relay contacts 57 and 60 are closed, thereby placing a ground or zero bias potential upon lead 55 and the respective emitter diodes. Under these conditions, the respective signal sources 35, 36 and 37 are rendered responsive to the negative polarity signals produced by each of the flip-flops 10, 11 or 12 upon each reversal from the "0" condition of operation to the "1" condition of operation and which appear at the respective right output circuit terminals, 34, 44 or 46, thereof but are not responsive to the positive polarity signals produced by each of the flip-flops 10, 11 or 12 with each reversal from the "1" condition of operation to the "0" condition of operation and which also appear at the respective right output circuit terminals, 34, 44 or 46, thereof.

Therefore, by selectively biasing the respective base and emitter diodes of the several signal sources, the next succeeding flip-flop of the counting chain circuit of this invention may be triggered with each reversal of condition of operation of the preceding flip-flop of the counting chain from the "1" condition to the "0" condition for forward counting or with each reversal of condition of operation of the preceding flip-flop of the counting chain from the "0" condition to the "1" condition for reverse counting.

This operation may best be illustrated by assuming that seven positive pulses have been applied to the input circuit terminal 16 of flip-flop 10 from pulse source 67 through lead 68 and that the next pulse received therefrom is to be added or counted in a forward direction. Under these conditions, flip-flops 10, 11 and 12 are all in the "1" condition and flip-flop 13 is in the "0" condition which is the binary coded decimal designation of the decimal digit 7 or a "1" in the first, second and third bit positions and a "0" in the fourth bit position of the binary coded decimal four bit per character group. With switch 64 open and respective signal sources 35, 36 and 37 thereby rendered responsive to positive polarity signals, the next positive signal received from pulse source 67 and applied through lead 68 to input circuit terminal 16 of flip-flop 10 will reverse the condition of operation thereof from the "1" to the "0" condition, thereby producing a positive polarity signal upon output circuit terminal 34 thereof in a manner previously described. This positive signal is effective to trigger signal source 35, thereby producing a positive signal at point 40 thereof which is applied to the input circuit terminal of flip-flop 11, thereby reversing its condition of operation from the "1" condition to the "0" condition which results in the appearance of a positive polarity signal at the right output circuit terminal 44 thereof. This positive signal is effective to trigger signal source 36, with the resulting production of a positive-going signal at point 41 thereof which is applied to the input circuit terminal of flip-flop 12, thereby reversing its condition of operation from the "1" condition to the "0" condition which results in the appearance of a positive polarity signal at the right output circuit terminal 46 thereof. This positive polarity signal is effective to trigger signal source 37, with the resulting production of a positive polarity signal at point 42 thereof which is applied to the input circuit terminal of flp-flop 13, thereby reversing its condition of operation from the "0" to the "1" condition. The presence of a "0" condition in each the first, second and third positions and the presence of a "1" condition in the fourth position of a four bit per group binary coded decimal code is the binary coded decimal designation of the numerical digit 8, or 7 plus 1.

Assume now that the binary coded decimal designation of the decimal digit 7 is present in the counting circuit, that is with flip-flops 10, 11 and 12 in the "1" condition of operation and flip-flop 13 in the "0" condition of operation, and that the next positive pulse from pulse source 67 is to be subtracted therefrom. In this instance, switch 64 is closed, thereby providing the proper bias arrangement to render signal sources 35, 36 and 37 responsive to negative polarity signals. The appearance of a positive pulse from pulse source 67, which is applied to the input circuit terminal 16 of flip-flop 10 through lead 68, reverses the condition of operation of flip-flop 10 from the "1" to the "0" condition. As this reversal produces a positive polarity signal at output circuit terminal 34, and since respective signal sources 35, 36 and 37 are unresponsive to positive polarity signals at this time, signal source 35 is unaffected and the condition of operation of the next succeeding flip-flop 11 of the counting chain is unaffected. The presence of a "1" condition of operation in the second and third positions and the presence of a "0" condition of operation in the first and fourth positions of a binary coded decimal four bit per character group is the binary coded decimal designation of the numerical digit 6 or 7 minus 1. The next positive pulse from source 67 will again reverse the condition of operation of flip-flop 10 from the "0" to the "1" condition of operation, thereby producing a negative polarity signal at the right output circuit terminal 34 thereof. As the respective signal sources 35; 36 and 37 are responsive to negative polarity signals at this time, source 35 is triggered thereby producing a positive polarity signal at point 40 thereof which is applied to flip-flop 11, thereby reversing its condition of operation from the "1" to the "0" condition. The resulting positive polarity signal appearing at the right output circuit terminal 44 as a result of a change of condition of operation of flip-flop 11 from the "1" to the "0" condition is ineffective to trigger signal source 36 at this time, and, therefore, the next succeeding flip-flop 12 of the counting chain remains unaffected. The presence of a "1" condition of operation in the first and third positions and a "0" condition of operation in the second and fourth positions of a binary coded decimal four bit per character group is the binary coded decimal representation of the decimal digit 5 or 6 minus 1.

While certain definite polarities and specific connections have been described during the course of the specification, it is to be specifically understood that different polarities and connections may be made without altering the operation of the circuit of this invention.

While a preferred embodiment of this invention has been shown and described, it will be obvious to those skilled in the art that various modifications and substitutions may be made without departing from the spirit of this invention which is to be limited only within the scope of the appended claims.

What is claimed is:

1. A reversible counter comprising a plurality of first means each having an input responsive to a series of pulses of a given polarity applied thereto and an output producing a first potential in response to alternate pulses applied to the input thereof and producing a second potential in response to pulses intermediate said alternate pulses applied to the input thereof, a pulse source for applying a series of pulses of said given polarity to the input of a first one of said first means, and second means interposed between the output of each first means and the input of a following first means, said second means including an amplifier for producing, as an output, pulses of said given polarity in response to input pulses of said given polarity being applied to a first input thereof and in response to input pulses of a polarity opposite to said given polarity being applied to a second input thereof, a first differentiating circuit for applying the output of the preceding first means to the first input of said amplifier, a second differentiating circuit for applying the output of the preceding first means to the second input of said amplifier, shunting means for selectively shunting either one of said first and second inputs of said amplifier, and output means for applying the output of said amplifier as an input to the following first means.

2. The reversible counter defined in claim 1, wherein said shunting means includes a first unidirectional conducting device connected to said first input of said amplifier and a second unidirectional conducting device connected to said second input of said amplifier, and switch means having first and second positions for forward biasing one of said unidirectional conducting devices and back biasing the other of said unidirectional devices when said switch means is in its first position and for back biasing said one of said unidirectional conducting devices and forward biasing said other of said unidirectional devices when said switch means is in its second position.

3. The reversible counter defined in claim 2, wherein said given polarity of said pulses is positive, wherein said amplifier is a P-N-P transistor having an emitter, a base and a collector, wherein said first differentiating circuit includes a first capacitance connected between the output of the preceding first means and said emitter and a first resistance connected between said emitter and a point of reference potential, wherein said second differentiating circuit includes a second capacitance connected between the output of the preceding first means and said base and a second resistance connected between said base and said point of reference potential, wherein said output means includes a third resistance connected between said collector and a point of negative potential, wherein said first unidirectional conducting device is poled to be back biased by a negative potential applied thereto and said second unidirectional conducting is poled to be back biased by a positive potential applied thereto, and wherein said switch means applies a negative potential to said first unidirectional conducting device and reference potential to said second unidirectional conducting device in said first position thereof and applies reference potential to said first unidirectional conducting device and a positive potential to said second unidirectional conducting device in said second position thereof.

References Cited in the file of this patent

UNITED STATES PATENTS

| | | |
|---|---|---|
| 2,536,917 | Dickinson | Jan. 2, 1951 |
| 2,816,226 | Forrest et al. | Dec. 10, 1957 |
| 2,819,394 | Gordon et al. | Jan. 7, 1958 |
| 2,841,705 | Moerman | July 1, 1958 |